3,350,343
PRINTING INK COMPOSITION

Michele Manica and Mauro Bassi, Ferrara, Italy, assignors to Montecatini Edison S.p.A., Milan, Italy
No Drawing. Filed Feb. 11, 1964, Ser. No. 343,955
5 Claims. (Cl. 260—33.8)

This invention is directed to a printing ink composition and, more particularly, to a method of preparing a printing ink which is particularly suitable for printing and/or writing on surfaces of polyolefins. More specifically, this invention is directed to an ink composition which can be used to print or write on polypropylene materials.

Several methods and compositions have been suggested for use in printing or writing on polyolefin surfaces, but many of these have not proven to be completely satisfactory. In some of the methods, for example, in order to increase the adherence of the ink, a pre-treatment of the printing surface was required. This included exposing the surface to a flame or an electrostatic discharge which made the surface more receptive to the ink. These particular methods, however, have proven to be inconvenient and impractical from the economical standpoint. Still more recently, inks comprising polyolefin homopolymers or chemically modified homopolymers have been suggested. These, however, while not requiring a pre-treatment as mentioned above, have not proven to be resistant to abrasion or to chemical reagents, light, etc.

Accordingly, it is an object of this invention to provide an ink composition which can be used satisfactorily without requiring a pre-treatment of the surface and, more particularly, is substantially resistant to chemical reagents and physical abuse.

It is another object of this invention to provide an ink composition which can be used as a writing or printing medium on polyolefin surfaces and, more particularly, on polypropylene surfaces.

It is still a further object of this invention to provide a method of preparing an ink composition which is substantially resistant to fading and imparts a brilliant appearance to the printed surface.

These and other objects of the invention will become apparent from the further and more detailed description of the invention which follows:

It has been discovered, quite unexpectedly, that an ink composition having a particularly good affinity for polyolefin surfaces can be prepared from a solution of a linear chlorosulfonated ethylene-propylene copolymer. This copolymer can be further characterized as being a linear, amorphous chlorosulfonated copolymer of ethylene and propylene which has a propylene content ranging from about 80 to 20 mole percent and more preferably from about 60 to 40 mole percent. The sulfur content of the copolymer ranges from about 0.5% to 2.0% by weight and the chlorine content ranges from about 5.0% to 20% by weight of the copolymer. A typical example of preparing these copolymers consists essentially of dissolving approximately 10 grams of an ethylene-propylene copolymer in 200 ml. of carbon tetrachloride. The copolymer contains approximately 45% by weight of propylene and has an intrinsic viscosity of $2.92 \times 10^2$ cc./gram. This solution of copolymer is then chlorosulfonated by adding over a period of 30 minutes, 0.9 ml. of $SO_2Cl_2$ dissolved in 50 mls. of $CCl_4$. The reaction mixture was heated to about 50° C. The reaction was stopped after about 30 minutes by pouring the solution into an excess of methanol. The coagulated copolymer was dried under a vacuum at 65° C. A further detailed description of these chlorosulfonated ethylene-propylene copolymers can be found in copending application Serial No. 828,419 filed on July 20, 1959.

In order to add a more brilliant appearance to the printed matter and to improve the adhesive characteristics of the composition, it is important to add small, but effective amounts ranging from 0.1 to 10% by weight of an epoxy resin. Amounts of about 1% by weight are preferably used. Of the many epoxy resins applicable, the preferred compounds include the condensation products of bisphenol and epichloridrin. In addition, to further improve the adhesive characteristics and more particularly to provide an ink which is remarkably resistant to wear or abrasion, it was found to be desirable to include a small but effective amount of at least one polyamine and/or polyamide. While the addition of the polyamine or polyamide is not critical to the ink composition, it has been found that the use of these compounds, in fact, not only substantially improves the adhesive characteristics, but also stabilizes the composition to exposure to sunlight and various chemical reagents. Accordingly, the amount of the polyamide or polyamine to be used in each case will depend upon the ultimate use of the ink, but for most practical purposes an amount ranging from 0.1 to 5% by weight and more preferably 1–2% by weight may be used satisfactorily. Ethylenediamine, diethylenetriamine, triethylenetetramine, tetraethylenepentamine may, for instance, be used as the polyamine/polyamide additive.

Likewise, the color of the ink can vary depending on the ultimate use and in many cases can be transparent. In those instances, however, where it is desirable to have a covering ink, various colors and/or pigments may be used in substantial amounts which may be varied over wide limits. In some instances pigments, e.g. titanium dioxide, may be added to the composition in an amount ranging up to about 30% by weight of the total composition. The shade or color of the ink obviously can be varied in accordince with the amount of dye or pigment employed. It has been found that, even in instances where a substantial amount of color or pigment was used, the ink was stable over a long period of time. The organic solvents which may be used in the preparation of the ink may be selected from aliphatic hydrocarbons, either saturated or not, aromatic hydrocarbons and halogenated derivatives thereof. Examples of solvents which may be used are: heptane, hexane, toluene, benzene, trichloroethylene, tetrachloroethylene, dichloroethane and carbon tetrachloride. The preferred solvent is carbon tetrachloride. The chlorosulfonated copolymer may be present in the solution in amounts ranging from 0.1% by weight up to complete saturation; preferably, however the solution contains about 5% by weight of copolymer.

In preparing the ink composition, the chlorosulfonated copolymer can be digested in carbon tetrachloride for a period varying from about 17 to 24 hours. To facilitate solubilizing the copolymer in the solvent, it is advisable to agitate the mixture. At this point an epoxy resin is added so as to obtain a base solution. To this base the polyamine or polyamide may be added together with a coloring agent in an amount depending upon the ultimate use and purpose of the ink. The ink thus obtained can be applied by any practical means in a very simple manner. The application of the ink does not require a pre-treatment of the surface, except maybe a simple washing with a solvent such as carbon tetrachloride. The density of the composition will vary within a wide range, again depending upon its ultimate use. Thus, for example, when it is to be used for printing, high densities are preferred whereas in those instances where the ink is to be sprayed, lower densities are more suitable. After the ink has been applied, it is desirable to let the printed matter set at a temperature ranging from about 100° C. to 130° C. for a period of about two or three minutes. After the printed object is cooled, the ink is bonded to the surface and has been found to be highly resistant to both abrasion and chemical reagents.

Of particular importance, inks prepared from the base compositions of this invention comprising a chlorosulfonated ethylene-propylene copolymer were found to exhibit a higher resistance to chemical reagents such as lubricating oil and sunlight as determined by the ASTM procedure D620–57T. In addition, the copolymer-containing inks have remarkably higher adhesion properties in comparison to those inks prepared from chlorosulfonated polyethylene or chlorosulfonated polypropylene. A comparison of the chlorosulfonated copolymers with the chlorosulfonated polyethylenes and polypropylenes is set forth in Table 1.

TABLE 1

|  | Example A | Example B | Example C |
| --- | --- | --- | --- |
|  | Experiment of ink containing— | | |
|  | Chlorosulfonated polyethylene | Amorphous Chlorosulfonated polypropylene | Chlorosulfonated ethylenepropylene copolymer |
| Adhesion measured by adhesive tape. | Very poor | No frilling of the ink from the surface. | No frilling of the ink from the surface. |
| Resistance to abrasion | | Not good (poor) | Good. |
| Resistance to lubricating oils | Poor | Poor | Good after long contact. |
| Exposition to sunlight (ASTM D620–57T) and control by an adhesive tape. | Very poor resistance | | Good resistance after 150 hours. |

It should be observed from the examples in Table 1 that the ink compositions containing the chlorosulfonated ethylene-propylene copolymer were substantially better with respect to adhesion, abrasion, resistance to the oil, and light stability in comparison to equivalent ink compositions containing either the chlorosulfonated polyethylene or polypropylene. Thus, because of the improved chemical and physical characteristics, the inks of this invention may be used for printing, writing, etc. on various surfaces and particularly on olefinic plastic materials. More particularly, it has been found that these inks may be used on crystalline polypropylene surfaces which comprise polypropylene prevailingly consisting of macromolecules having an isotactic structure. In other words, the ink compositions are particularly applicable to crystalline polypropylene which prevailingly, or at least 50%, macromolecules having an isotactic structure as more specifically disclosed by Natta et al. e.g. in U.S. Patent No. 2,882,263.

To further identify the ink compositions of this invention, the following examples are given as illustrations.

EXAMPLE 1

Approximately 3 g. of an ethylene-propylene chlorosulfonated copolymer were digested in 95 g. of carbon tetrachloride for approximately 17 hours. This particular copolymer contained about 40 mol percent of propylene and had a chlorine content of about 7.1% by weight and a sulfur content of about 0.6% by weight. While the mixture was being vigorously agitated, approximately 1 g. of an Epikote resin and 30 g. of titanium dioxide were added. The resin is a condensation product of bisphenol and epichlorohydrin. The mixture was then left for a period of about 4 hours and was filtered to remove any small amounts of pigment which were not digested.

A polypropylene surface, after having been washed with carbon tetrachloride, was covered with the ink and then held in an oven at a temperature of about 100° C. to 130° C. for about 3 minutes. The coated surface was cooled with a stream of cold air and then tested to determine the degree of adhesion the ink had to the surface of the polypropylene. The test comprised the application of a transparent tape over the surface of the ink. After the tape was secured to the coated surface, it was quickly removed causing a tearing action between the surface of the tape and the polypropylene surface containing the ink. It was found by the tape test that there was no frilling of the ink from the surface of the polypropylene.

EXAMPLE 2

Approximately 5 g. of the chlorosulfonated copolymer of Example 1 were digested in 97 g. of carbon tetrachloride for about 24 hours. With agitation, about 1 g. of a bisphenol-epichlorohydrin epoxy resin and about 50 g. of titanium dioxide were added to the mixture. The mixture was left standing for about 4 hours and then filtered to remove any of the small amount of pigment which was not digested. A polypropylene sheet was washed with carbon tetrachloride and then coated with the ink. The coated surface was placed in an oven at a temperature of 100° C. to 130° C. for a period of about 3 minutes, and subsequently cooled by a stream of cold air. The ink-coated surface was then exposed to lubricating oil with an abrasive action of the oil on the surface. It was observed after continuous abrasion that no change occurred in the ink.

EXAMPLE 3

Approximately 3 g. of the chlorosulfonated copolymer of Example 1 were digested in about 95 g. of carbon tetrachloride for a period of 17 hours. With strong agitation, about 1 g. of an epichlorohydrin-bisphenol epoxy resin and 30 g. of titanium dioxide were added to the mixture. The mixture was left standing for about 3 hours and then filtered to remove any of the non-digested pigment. A polypropylene object which had been washed in carbon tetrachloride was covered with the ink and placed in an oven for about three minutes at a temperature 100° C. to 130° C. The object was then cooled by means of a cool air stream. Samples of the ink-coated surface were taken and exposed to sunlight in accordance with the method of ASTM D620–57T. These samples were found to have maintained their resistance to the sunlight and their adhesive characteristics for more than 150 hours.

EXAMPLE 4

Approximately 5 g. of a chlorosulfonated ethylene-propylene copolymer were digested in about 97 g. of carbon tetrachloride for a period of 24 hours. The copolymer contained approximately 50 mole percent of propylene, 7.1% by weight of chlorine and about 0.67% by weight of sulfur. With strong agitation, 1 g. of a bisphenol-epichlorohydrin resin and 50 g. of titanium dioxide were added to the mixture. This mixture was left standing for about 4 hours and then filtered to remove any of the non-digested pigment. Approximately 1 g. of tetraethylenepentamine was subsequently added to the ink composition. A polypropylene surface, after being washed with carbon tetrachloride, was covered with the ink and placed in an oven at a temperature of about 100° C. to 130° C. for about 3 minutes. The ink-coated surface was then cooled by a stream of cold air.

Samples of the above-treated surface were then subjected to adhesion and resistance tests for purposes of determining the improvements obtained by the addition of the polyamine.

TABLE 2

| | Example D | Example E |
|---|---|---|
| | Experiment of ink containing— | |
| | Chlorosulfonated ethylenepropylene copolymer | Chlorosulfonated ethylenepropylene copolymer+ polyamine |
| Adhesion measured with adhesive tape. | Good | Very good. |
| Resistance to lubricating oils. | Good after prolonged contact. | Very good after prolonged contact. |
| Exposition to sunlight (ASTM D620-57T) and control by means of tape. | Good resistance after 150 hours. | Very good resistance after 150 hours. |

It should be noted from the above table that the ink composition containing the polyamine, i.e. tetraethylenepentamine, was still better in its adhesive characteristics, its resistance to light and to a chemical reagent.

While this invention has been described with respect to a number of specific embodiments, it is obvious that there are many other modifications and variations which can be made without departing from the spirit of the invention, except as more particularly pointed out in the appended claims.

What is claimed is:

1. An ink composition for use on polyolefin surfaces which composition consists essentially of a solution of from about 0.1% by weight to the saturation amount of a chlorosulfonated ethylene-propylene copolymer in a solvent selected from the group consisting of unsubstituted and halogen substituted saturated and unsaturated aliphatic hydrocarbons and aromatic hydrocarbons, said solution containing from 0.1–10% by weight of a condensation product of bisphenol and epichlorohydrin and a small amount of a coloring agent, said chlorosulfonated ethylene-propylene copolymer being a linear amorphous copolymer containing from about 60–50 mole percent of propylene, 0.5–2% by weight of sulfur and 5–20% by weight of chlorine.

2. The ink composition of claim 1 wherein solution of the chlorosulfonated ethylene-propylene copolymer is in carbon tetrachloride.

3. The ink composition of claim 2 wherein the chlorosulfonated ethylene-propylene copolymer is present in the solution in an amount of about 5% by weight of the carbon tetrachloride.

4. The ink composition of claim 3 which further contains about 2% by weight of an organic nitrogen compound selected from the group consisting of polyamines and polyamides.

5. The ink composition of claim 4 wherein the organic nitrogen compound is tetraethylenepentamine.

References Cited

UNITED STATES PATENTS 2,618,574 11/1952 Pavlic.
2,879,261 3/1959 Johnson et al. _____ 260—33.8
3,079,218 2/1963 DiGiulio et al. _____ 260—33.8
3,253,940 5/1966 Floyd et al. _____ 106—20

MORRIS LIEBMAN, *Primary Examiner.*

J. S. WALDRON, S. L. FOX, *Assistant Examiner.*

UNITED STATES PATENT OFFICE
CERTIFICATE OF CORRECTION

Patent No. 3,350,343                      October 31, 1967

Michele Manica et al.

It is hereby certified that error appears in the above numbered patent requiring correction and that the said Letters Patent should read as corrected below.

In the heading to the printed specification, after line 5, insert -- Claims priority, application Italy Feb. 14, 1963 3039/63 --.

Signed and sealed this 22nd day of April 1969.

(SEAL)
Attest:

Edward M. Fletcher, Jr.                 EDWARD J. BRENNER
Attesting Officer                      Commissioner of Patents